United States Patent Office 3,335,822
Patented Aug. 15, 1967

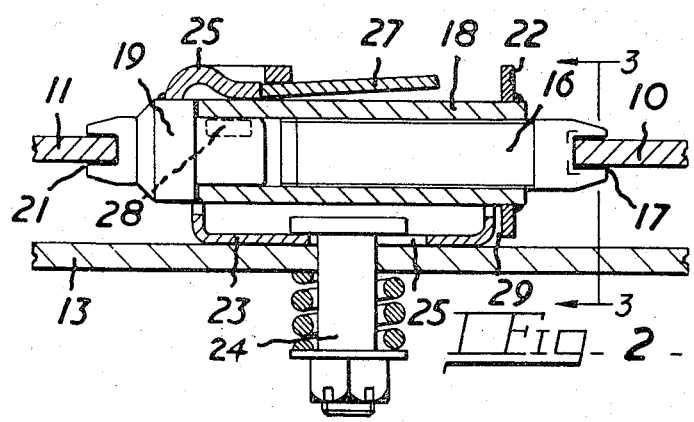
Fig. 2
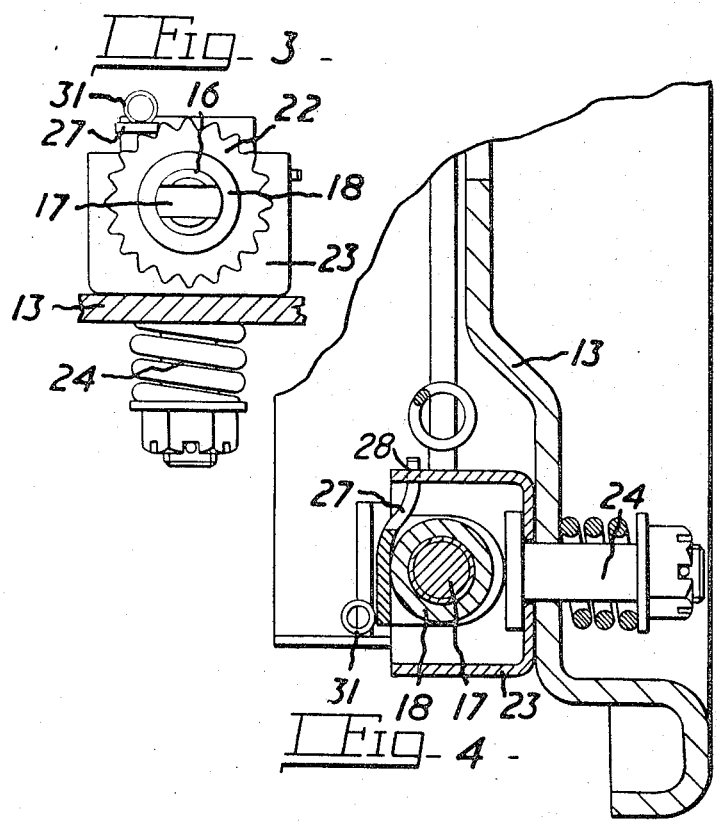
Fig. 3
Fig. 4

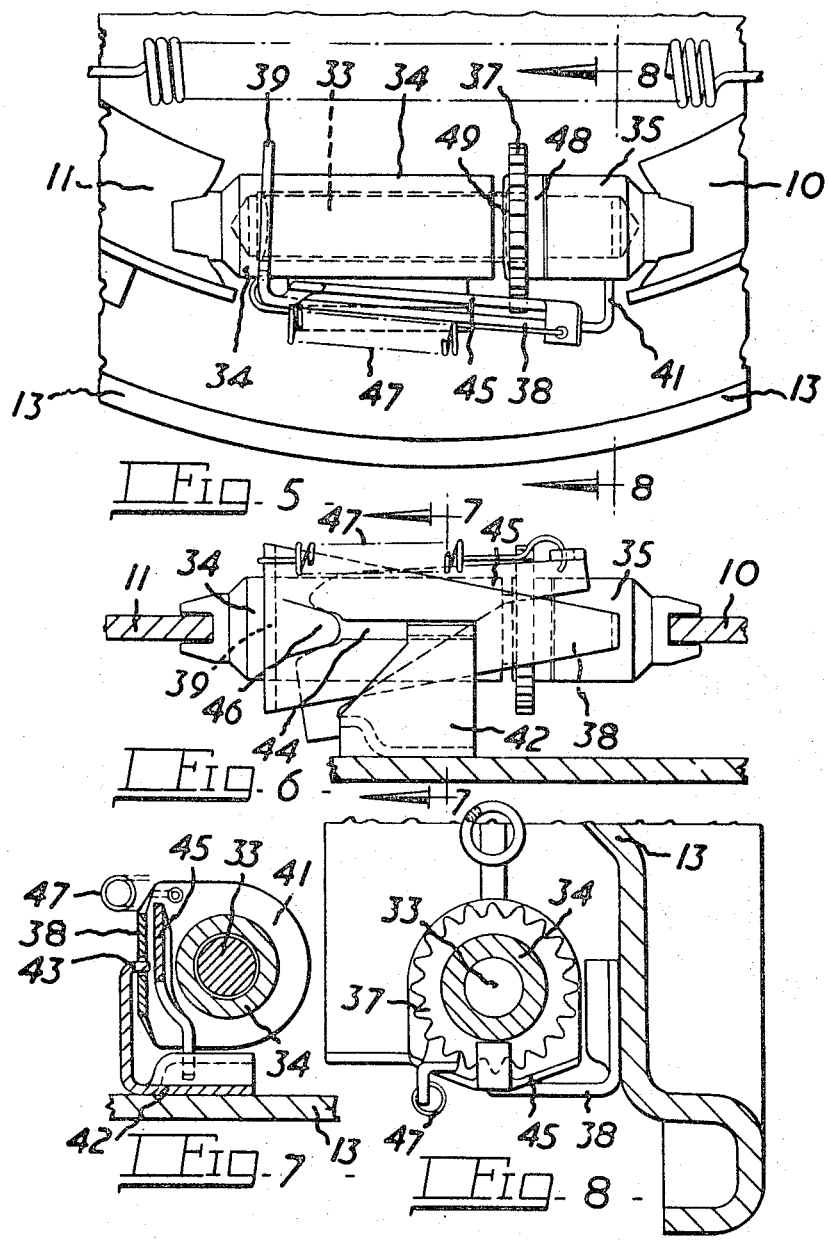

3,335,822
AUTOMATIC ADJUSTER FOR SHOE DRUM BRAKES
Roy Ernest Edwards, Blackheath, Birmingham, England, assignor to Girling Limited, Birmingham, England, a British company
Filed Feb. 5, 1965, Ser. No. 435,398
Claims priority, application Great Britain, Feb. 5, 1964, 4,810/64
4 Claims. (Cl. 188—79.5)

This invention relates to a new or improved adjuster for shoe drum brakes of the kind in which arcuate shoes carrying friction linings and mounted on a stationary back plate are adapted to be brought into engagement with a rotatable drum.

According to our invention, in a shoe drum brake of that kind adjustment of the off position of one shoe is effected automatically by means dependent on the total wear of the friction linings of both shoes.

The adjusting mechanism incorporates means whereby, when the brake is applied with the drum rotating in one direction, preferably the normal forward direction, a dataum is established which determines whether adjustment is required and the extent of the adjustment.

Two embodiments of our invention are illustrated by way of example in the accompanying drawings in which:

FIGURE 2 is a section of the adjuster on the line 2—2 of FIGURE 1;

FIGURE 3 is an end view of the adjuster on the line 3—3 of FIGURE 2;

FIGURE 4 is a transverse section on the line 4—4 of FIGURE 1;

FIGURE 5 is a front view of a modified form of adjuster;

FIGURE 6 is a plan of the adjuster shown in FIGURE 5;

FIGURE 7 is a tranverse section on the line 7—7 of FIGURE 6; and

FIGURE 8 is a transverse section on the line 8—8 of FIGURE 5.

Figure 1:
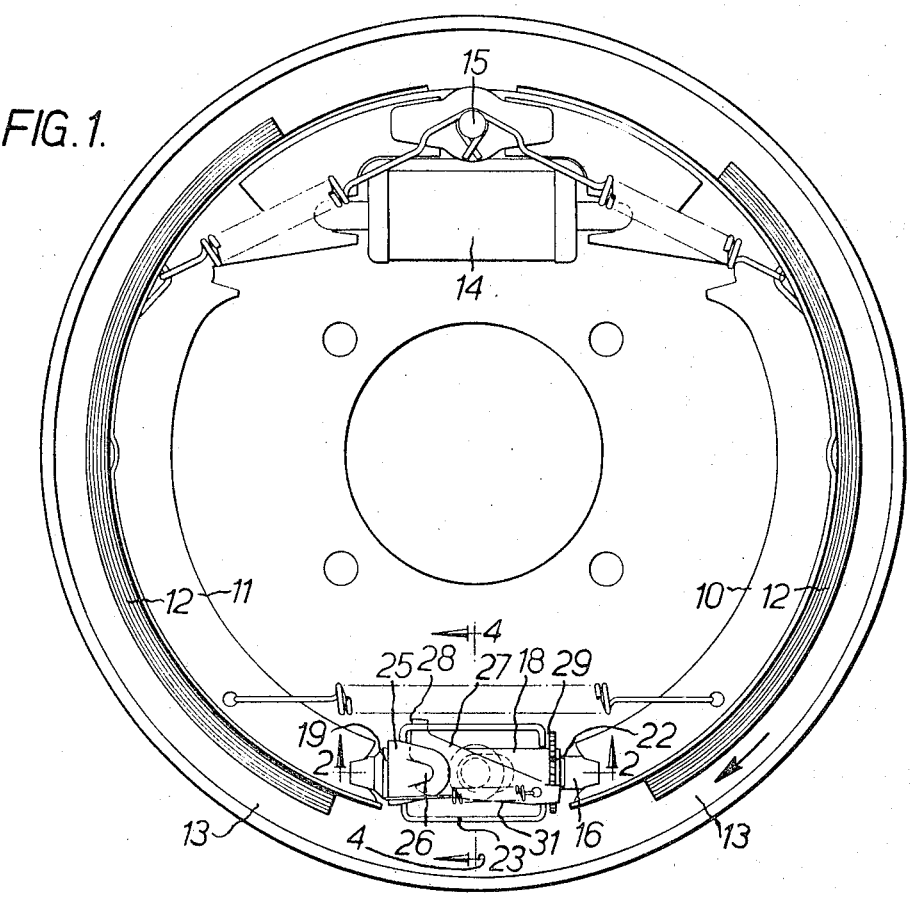
FIGURE 1 is a front view of a brake omitting the brake drum.

The brake illustrated in FIGURES 1 to 4 is of the kind known as a duo-servo brake and comprises two arcuate shoes 10, 11 carrying friction linings 12 and mounted on a stationary back-plate 13. The shoes are adapted to be separated at one end by an expander 14 of any convenient type to bring them into engagement with a rotatable drum (not shown). The other ends of the shoes are connected by a thrust member of adjustable length, and when the brake is applied with the drum rotating in the direction indicated by the arrow in FIGURE 1 the shoe 10 acts as a primary shoe and applies a circumferential thrust to the shoe 11 through the thrust member, the torque on the shoes being taken by an anchor pin 15 mounted in the backing plate adjacent to the expander 14.

The thrust member comprises a tappet 16 having at its outer end a notch 17 to receive the web of the primary shoe 10 and having a screw-threaded stem received in the screw-threaded bore of a sleeve 18 which is in rotatable engagement with a shouldered end plug 19 having in its outer end a notch 21 to receive the web of the secondary shoe 11.

The end of the sleeve 18 adjacent to the primary shoe 10 carries a peripherally toothed flange or wheel 22 which may be integral with or welded or otherwise rigidly secured to the sleeve.

The thrust member formed by the tappet, sleeve and end plug is movable axially through openings in spaced parallel end walls of a housing 23 of open box form secured to the back plate 13 of the brake by a spring-loaded bolt 24 passing through a slot 25 in the housing and permitting a limited circumferential movement of the housing against frictional resistance.

The end plug 19 which engages with the secondary shoe 11 carries a bracket 25 from which is punched a fulcrum abutment 26 on which is pivoted a spring-loaded bell-crank lever 27. One arm of the lever engages in a stop hole 28 in the housing and the other end extends in an axial direction beyond the plane of the toothed wheel 22 on the sleeve and is biased by a spring 31 into engagement with the periphery of the wheel.

Normally, in the off position of the brake with the drum rotating in the normal forward direction indicated by the arrow in FIGURE 1, the secondary shoe 11 is in light rubbing contact with the brake drum. When the brake is applied the primary shoe 10 acting through the thrust member urges the secondary shoe 11 into engagement with the drum and the movement of the thrust member will normally be not more than the clearance 29 between the toothed wheel 22 on the sleeve and the adjacent end of the housing.

However, when wear of the lining of the shoe 11 has taken place a greater movement of the thrust member is required so that the clearance 29 is fully taken up when the brake is applied and then the wheel 22 engages the housing and moves the housing to the left through a distance dependent on the lining wear.

Initially the bell crank end may be positioned as in FIG. 3. Then when the brake is applied with the drum rotating in the reverse direction the secondary shoe 11, which is now acting as a primary shoe, moves the thrust member back through the housing to the right until the shoe 10 is brought into engagement with the drum. As the thrust member moves to the right, the housing remains in its position to which it had been displaced to the left through the retaining action of the spring loaded bolt 24. The bracket 25 carrying the fulcrum abutment 26 for the bell-crank lever 27 moves with the thrust member and, owing to the engagement of the first arm of the lever in the stop hole 28 in the housing, the bell crank lever is moved angularly counter-clockwise in FIG. 1 (to the right in FIG. 3) and engages with the toothed wheel 22 to rotate the sleeve 18 and so increase the effective length of the thrust member.

Upon the next application during forward movement of the wheel, the thrust member is moved to the left through the housing and upon this occurrence any inward force exerted on the bell crank by the opening 28 due to its displaced inward position relative to the line of action of the spring 31 is removed so that the spring 31 swings the bell crank end outwardly in FIG. 1 (upwardly in FIG. 3) clear of the wheel 22 so that the bell crank is eventually returned to a position whereby it partakes of its initial position shown in FIG. 3 upon the next brake application with the drum rotating in the reverse direction due to the inwardly offset position of the abutment opening 28 relative to the spring 31. Upon this occurrence the star wheel 22 is again rotated provided brake wear is sufficient to move the bell crank through an angular distance sufficient which effects star wheel rotation.

The length by which the thrust member is increased is dependent on the distance through which the housing 23 has moved when the drum was rotating in the normal direction and the distance through which the thrust member has moved back with the drum rotating in the reverse direction so that it is dependent on the total wear of the linings on both shoes.

It will be appreciated that the movements involved are extremely small as the adjustment takes place automatically as soon as any appreciable wear of the shoe linings has taken place.

The movement of the housing to the left when the brake is applied with the drum rotating in the forward direction after there has been wear of the lining of the shoe 11 establishes a datum by which the adjustment effected by movement of the thrust member in the opposite direction is controlled.

It will be appreciated that the amount of the adjustment made in sensed when the braking drum is cold and there is no risk of over-adjustment due to the expansion of the drum when heated by prolonged application of the brake.

The energy required for making the adjustment is derived solely from the rotatable drum.

In the event of structure deflection under load the housing can move circumferentially on the bolt 24 to avoid damage to the adjusting mechanism.

In the arrangement described above adjustment takes place during braking in reverse, but it could be arranged to take place during either forward or reverse braking.

In a modification the spring may be arranged to store energy during forward braking and to apply this energy to rotating the sleeve on reverse braking.

In another modification one end of the bell crank lever may engage with a fixed abutment instead of with a housing movable on the back-plate.

In an alternative construction shown in FIGURES 5, 6, 7 and 8 the thrust member comprises a tappet 33 of which the inner end is in screw-threaded engagemet with a sleeve 34 having at its outer end a slot to receive the web of the secondary shoe 11. The outer end of the tappet is rotatably received in an axial recess in a plug 35 of which the outer end is slotted to receive the web of the primary shoe 10.

A housing 38 for the thrust member is formed by a substantially flat plate of spring steel having at opposite ends apertured cranked flanges 39, 41 to receive the thrust member assembly.

The flange 39 of the housing is inclined inwardly at an angle differing slightly from a right angle to the axis of the thrust member and the diameter of the aperture in the flange is only slightly greater than that of the sleeve 34 so that the thrust member can move through the housing in a direction from right to left in FIGURE 5 but is locked against movement from left to right.

A bracket 42 fixed on the back-plate 13 of the brake carries a lug 43 engaging in a slot 44 in the housing to limit the circumferential movement of the housing, the lug 43 normally being spaced from the right hand end of the slot 44 by a distance determined by the desired clearance to be maintained between the shoes and the drum. Adjustment of the thrust member is effected by a bell-crank lever 45 which is pivoted on an abutment 46 on the housing and is loaded by a spring 47. One arm of the lever extends longitudinally beyond the toothed wheel 37 and the other arm is adapted to engage the bracket 42 as shown more particularly in FIGURE 6.

When the brake is applied with the drum rotating in its normal forward direction the thrust member and the housing move as a unit owing to the frictional engagement between them until the housing is arrested by the engagement of the end of the slot 44 with the lug 43 which will occur when the movement of the thrust member exceeds the clearance provided between the lug and the end of the slot.

The thrust member when moves forwardly through the housing for a distance dependent on the wear of the lining of the shoe 11. Then when the brake is applied with the drum rotating in the opposite direction the thrust member binds in the housing and takes the housing back with it. Relative movement between the housing and the bracket 42 causes the second arm of the bell crank lever to engage the bracket and the lever is rocked about its pivot so that the first arm engages the toothed wheel 37 and moves the tappet 33 angularly relative to the sleeve 34 to increase the effective length of the thrust member.

The toothed wheel 37 may be rigidly fixed on the tappet 33 or, as shown in the drawings, it may be formed as a ring rotatably mounted on a stepped portion of the tappet and held in tight frictional engagement with the shoulder at the end of the step by a dished spring washer 49.

This allows the toothed wheel to rotate on the tappet and avoids damage to the mechanism when the thrust member is under load and further adjustment is demanded by expansion of the drum or deflection of the shoes under load.

In both of the constructions illustrated the adjuster is a self-contained unit which can be assembled before it is fitted to the back-plate of the brake and the means for making the adjustment are located within the unit itself so that no levers or other connections extending across the drum are required.

I claim:

1. In a brake comprising a drum, a stationary back-plate, opposed arcuate shoes mounted on said back-plate, and anchorage and applying means between one pair of adjacent ends of the shoes, an adjusting device located between the adjacent opposite ends of the shoes and comprising a housing mounted on said back-plate for limited movement thereon, a thrust member of adjustable length extending through said housing and engaging at opposite ends with said opposite adjacent ends of the shoes, said thrust member incorporating two parts which are in screw-threaded engagement with each other and of which one carries a star-wheel and is rotatable to increase the effective length of the thrust member, and a spring-pressed bell crank lever cooperating with said star-wheel, said thrust member being movable through the housing when the brake is applied with the drum rotating in one direction and taking the housing with it when the brake is applied with the drum rotating in the other direction and the movement of the thrust member exceeds a predetermined value owing to wear of the shoe linings, and abutment means engageable with said bell crank to operate said star wheel and increase the effective length of said thrust member in response to relative movement in one direction between said thrust member and said back plate whenever the movement of said thrust member is in excess of said predetermined value.

2. In a brake comprising a drum, a stationary back-plate, opposed arcuate shoes mounted on said back-plate, and anchorage and applying means between one pair of adjacent ends of the shoes, an adjusting device located between the opposite adjacent ends of the shoes and comprising a housing mounted on said back-plate for circumferential movement relative to the back-plate, a thrust member of adjustable length extending through said housing and engaging said opposite adjacent ends of the shoes, said thrust member incorporating two parts which are in screw-threaded engagement with each other and of which one carries a star-wheel and is rotatable to increase the effective length of the thrust member, and a spring-pressed bell crank lever co-operating with said star-wheel, said thrust member being movable through the housing for a limited distance in at least one direction on application of the brake with the drum rotating in one direction, said thrust member being constructed and arranged to take the housing with it if the movement exceeds a predetermined value owing to wear of the shoe linings whereby the off position of one shoe is adjusted, and abutment means engageable with said bell crank to operate said star wheel and increase the effective length of said thrust member in response to relative movement in one direction between said thrust member and said back plate whenever the movement of said thrust member is in excess of said predetermined value.

3. In a brake comprising a drum, a stationary back-plate, opposed arcuate shoes mounted on said back-plate, and anchorage and applying means between one pair of adjacent ends of the shoes, an adjusting device located between the opposite adjacent ends of the shoes and comprising a housing mounted on said back-plate for circumferential movement thereon, a thrust member movable for a limited distance through said housing and engaging at opposite ends with said opposite adjacent ends of the shoes, said thrust member incorporating two parts which are in screw-threaded engagement with each other and of which one is rotatable to increse the effective length of the thrust member, a spring-loaded bell crank lever pivotally mounted on the thrust member, one arm of said lever co-operating with an abutment on the housing and the other arm co-operating with peripheral ratchet teeth on the rotatable part of the thrust member, the thrust member moving through the housing on application of the brake with the drum rotating in the normal forward direction, said thrust member and said housing having inter-engageable parts whereby said thrust member takes said housing with it into a new position if the movement of the thrust member exceeds a predetermined value owing to wear of one shoe lining, said thrust member returning through the housing on application of the brake with the drum rotating in the reverse direction, whereby the abutment on said housing effects rocking of said bell crank lever about its pivot to rotate the rotatable part of the thrust member in a direction to increase the effective length of said member to compensate for wear of both shoe linings.

4. In a brake comprising a drum, a stationary back-plate, opposed arcuate shoes mounted on said back-plate, and anchorage and applying means between one pair of adjacent ends of the shoes, an adjusting device located between the opposite adjacent ends of the shoes and comprising a backet fixed on the back-plate, a housing mounted on the bracket for limited movement thereon, a thrust member of adjustable length engaging at opposite ends with said opposite adjacent shoe ends and mounted in said housing for movement therethrough in one direction only, said thrust member incorporating two parts which are in screw-threaded engagement and of which one is rotatable, said thrust member and said housing being constructed and arranged that said thrust member moves through the housing on application of the brake with the drum rotating in the normal forward direction after wear of one shoe lining has taken place, means preventing movement of said thrust member through said housing in the reverse direction whereby said thrust member takes said housing with it on movement in the opposite direction when the brake is applied with the drum rotating in the reverse direction, and ratchet and pawl mechanism actuated by movement of the housing relative to the bracket for rotating the rotatable part of the thrust member in a direction to increase the effective length of the thrust member.

References Cited

UNITED STATES PATENTS

| | | | |
|---|---|---|---|
| 2,152,041 | 3/1939 | Goepfrich | 188—79.5 |
| 2,222,858 | 11/1940 | Ryan | 188—79.5 |

DUANE A. REGER, *Primary Examiner.*